United States Patent
Kyono

(10) Patent No.: US 7,315,461 B2
(45) Date of Patent: Jan. 1, 2008

(54) POWER SUPPLY DEVICE

(75) Inventor: Yoichi Kyono, Niiza (JP)

(73) Assignee: Sanken Electric Co., Ltd. (JP)

( * ) Notice: Subject to any disclaimer, the term of this patent is extended or adjusted under 35 U.S.C. 154(b) by 334 days.

(21) Appl. No.: 10/520,607

(22) PCT Filed: Jan. 9, 2004

(86) PCT No.: PCT/JP2004/000089

§ 371 (c)(1),
(2), (4) Date: Jan. 6, 2005

(87) PCT Pub. No.: WO2004/068686

PCT Pub. Date: Aug. 12, 2004

(65) Prior Publication Data

US 2006/0056205 A1    Mar. 16, 2006

(30) Foreign Application Priority Data

Jan. 28, 2003    (JP) .............................. 2003-018778

(51) Int. Cl.
*H02M 3/335*    (2006.01)
(52) U.S. Cl. .................... 363/21.06; 363/97; 323/907
(58) Field of Classification Search .............. 363/21.4, 363/21.6, 21.1, 21.5, 44, 84, 89, 97, 127; 323/907, 908
See application file for complete search history.

(56) References Cited

U.S. PATENT DOCUMENTS 6,069,802 A *   5/2000  Priegnitz ................. 363/21.06
6,653,899 B2 * 11/2003  Organvidez et al. ..... 330/207 P
6,771,059 B1 *  8/2004  Zwicker ..................... 324/119
6,870,747 B2 *  3/2005  Bridge ..................... 363/21.06

FOREIGN PATENT DOCUMENTS

| JP | 62-89477 | 4/1987 |
| JP | 21237-1986 | 8/1987 |
| JP | 01-122367 | 5/1989 |
| JP | 88709/1989 | 3/1991 |
| JP | 05-40064 | 2/1993 |
| JP | 5298-1992 | 8/1993 |
| JP | 06-233528 | 8/1994 |

* cited by examiner

*Primary Examiner*—Rajnikant B. Patel
(74) *Attorney, Agent, or Firm*—Kilpatrick Stockton LLP

(57) ABSTRACT

An object of this power supply device is to enable an overheat protection level and an overvoltage protection level to be set accurately. This power supply device includes a Schottky barrier diode (D52), which is placed as a temperature detection element at a region where a temperature is measured, to which a reverse voltage is applied, and through which a reverse leakage current flows; a comparator (Z51) which sets a potential of an output terminal thereof to a low level when a voltage corresponding to the reverse leakage current becomes equal to or more than a reference voltage; and a light-emitting diode (PC2) which is connected between an output terminal (8a) and the output terminal of the comparator (Z51), and has a current of a predetermined value or more flowing therethrough to emit light because the output potential of the comparator (Z51) is set to the low level, wherein an operation of a control circuit (12) is stopped by a thyristor (TH1) which is turned on, based on the current flowing through a phototransistor PC1, in response to the light emission of the light-emitting diode (PC2).

11 Claims, 11 Drawing Sheets

POWER SUPPLY DEVICE

TECHNICAL FIELD

The present invention relates to a power supply device such as, for example, a DC-DC converter, and particularly, to a technology for protecting the power supply device from overheat and overvoltage.

BACKGROUND ART

Heretofore, a power supply device which includes an overheat protection circuit in order to remove a failure caused by overheat has been known. Temperature detection in this overheat protection circuit is performed by use of an expensive temperature-sensitive element dedicated for the temperature detection, such as a thermostat, a thermistor, a posistor. For example, an overheat protection circuit of a DC-DC converter includes the temperature-sensitive element such as the thermistor, and a control element such as a thyristor which operates in response to the temperature-sensitive element. When a temperature increase is detected by the temperature-sensitive element, a capacitor for a control power supply is discharged by the control element, and thus a supply of power to a control circuit is stopped, and an operation of the DC-DC converter is stopped.

Moreover, as such a power supply device including the overvoltage protection circuit, one in which a resistor is connected in parallel to a light-emitting diode forming a photocoupler has been known. For this resistor, one is selected, which flows a leakage current at a time when a zener diode is at a high temperature while detouring around the light-emitting diode, and has a resistance value capable of establishing a starting voltage of the light-emitting diode when a current from a voltage detection circuit reaches a set current value or more. Thus, a malfunction of the power supply device at the high temperature is prevented (refer to Japanese Patent Laid-Open No. Hei 6 (1994)-233528).

Incidentally, the thermostat, the thermistor, the posistor and the like, which are used as the temperature-sensitive element in the conventional overheat protection circuit, are expensive because production amounts thereof are small and temperature management therefor is finely performed, and the power supply device which uses these temperature-sensitive elements necessarily becomes expensive.

DISCLOSURE OF THE INVENTION

It is an object of the present invention to provide a power supply device capable of reducing cost.

The present invention is one which focuses attention on the fact that a reverse current of a Schottky barrier diode is radically increased at such a high temperature as, for example, 120° C., and configures a power supply device having overheat protection and overvoltage protection functions by use of the described characteristics.

The first invention is a power supply device including a main circuit which converts an inputted alternating current or direct current into another direct current, and a control circuit which controls the main circuit, the power supply device includes a Schottky barrier diode, which is placed as a temperature detection element at a region where a temperature is measured, to which a reverse voltage is applied, and through which a reverse leakage current flows; detecting means for detecting the reverse leakage current flowing through the Schottky barrier diode; and a control element which stops an operation of the control circuit when an output of the detecting means becomes equal to or more than a predetermined value.

According to the present invention, a change in the temperature is detected by use of the Schottky barrier diode. Accordingly, the cost reduction can be achieved to a great extent in comparison with the conventional power supply device using the expensive thermostat, thermistor or posistor.

In the second invention, the detecting means includes a light-emitting element connected to a direct current output terminal of the main circuit; a light-receiving element which flows a current in response to light emission of the light-emitting element; and current controlling means for flowing a current through the light-emitting element when a voltage corresponding to the reverse leakage current flowing through the Schottky barrier diode becomes equal to or more than a reference voltage, the current controlling means being connected between the Schottky barrier diode and the light-emitting element, wherein the control element stops the operation of the control circuit based on the current flowing through the light-receiving element.

According to the present invention, the current controlling means flows the current through the light-emitting element when the voltage corresponding to the reverse leakage current flowing through the Schottky barrier diode becomes equal to or more than the reference voltage. Thus, the overheat protection function is not affected by current transfer ratios of the light-emitting element and the light-receiving element, and an overheat protection level (latching temperature) can be set accurately. Moreover, when the voltage corresponding to the reverse leakage current flowing through the Schottky barrier diode is equal to or less than the reference voltage, the reverse leakage current does not flow into the light-emitting element, and accordingly, the reverse leakage current does not affect an overvoltage protection circuit. An overvoltage protection level (latching voltage) can be set accurately.

In the third invention, the current controlling means includes a resistor connected in series to the Schottky barrier diode; and a comparator which sets a potential of an output terminal thereof to a low level when a voltage which occurs in the resistor by the reverse leakage current flowing through the Schottky barrier diode becomes equal to or more than the reference voltage, wherein the light-emitting element is connected between a positive electrode end of the direct current output terminals and an output terminal of the comparator, and has a current of a predetermined value or more flowing therethrough to emit light when output potential of the comparator is set to the low level.

In the fourth invention, the power supply device includes a zener diode connected between the output terminal of the comparator and a negative electrode end of the direct current output terminals, wherein the zener diode flows the current through the light-emitting element when a voltage between the direct current output terminals becomes larger than a predetermined breakdown voltage.

In the fifth invention, the current controlling means includes a resistor connected in series to the Schottky barrier diode; and a transistor which is turned on when a voltage which occurs in the resistor by the reverse leakage current flowing through the Schottky barrier diode becomes equal to or more than the reference voltage, wherein the light-emitting element is connected between a positive electrode end of the direct current output terminals and the transistor, and has a current of a predetermined value or more flowing therethrough to emit light when the transistor is turned on.

In the sixth invention, the power supply device includes a zener diode connected between the light-emitting element and a negative electrode end of the direct current output terminals, wherein the zener diode flows the current through the light-emitting element when a voltage between the direct current output terminals becomes larger than a predetermined breakdown voltage.

In the seventh invention, the current controlling means includes a resistor connected in series to the Schottky barrier diode, wherein the light-emitting element is connected to both ends of the resistor, and has a current of a predetermined value or more flowing therethrough to emit light when a voltage which occurs in the resistor by the reverse leakage current flowing through the Schottky barrier diode becomes equal to or more than a forward threshold voltage.

In the eighth invention, the current controlling means includes a resistor connected in series to the Schottky barrier diode; and a diode in which an anode is connected to a connecting point of the Schottky barrier diode and one end of the resistor, wherein the light-emitting element is connected between a cathode of the diode and the other end of the resistor, and has a current of a predetermined value or more flowing therethrough to emit light when a voltage which occurs in the resistor by the reverse leakage current flowing through the Schottky barrier diode becomes equal to or more than a sum of a forward threshold voltage of the diode and a forward threshold voltage of the light-emitting element.

In the ninth invention, the power supply device includes a zener diode connected between a positive electrode end of the direct current output terminals and the light-emitting element, wherein the zener diode flows the current through the light-emitting element when a voltage between the direct current output terminals becomes larger than a predetermined breakdown voltage.

In the tenth invention, the power supply device includes a rectifying diode connected to a passage of a main current in the main circuit, wherein the Schottky barrier diode and the rectifying diode are thermally coupled to each other and mechanically integrated with each other.

In the eleventh invention, the power supply device includes a current detection resistor connected to a passage of a main current in the main circuit, wherein the Schottky barrier diode and the current detection resistor are thermally coupled to each other and mechanically integrated with each other.

BEST MODE FOR CARRYING OUT THE INVENTION

Power supply devices of embodiments of the present invention are described below in detail with reference to the drawings.

(First Embodiment)

Figure 1:
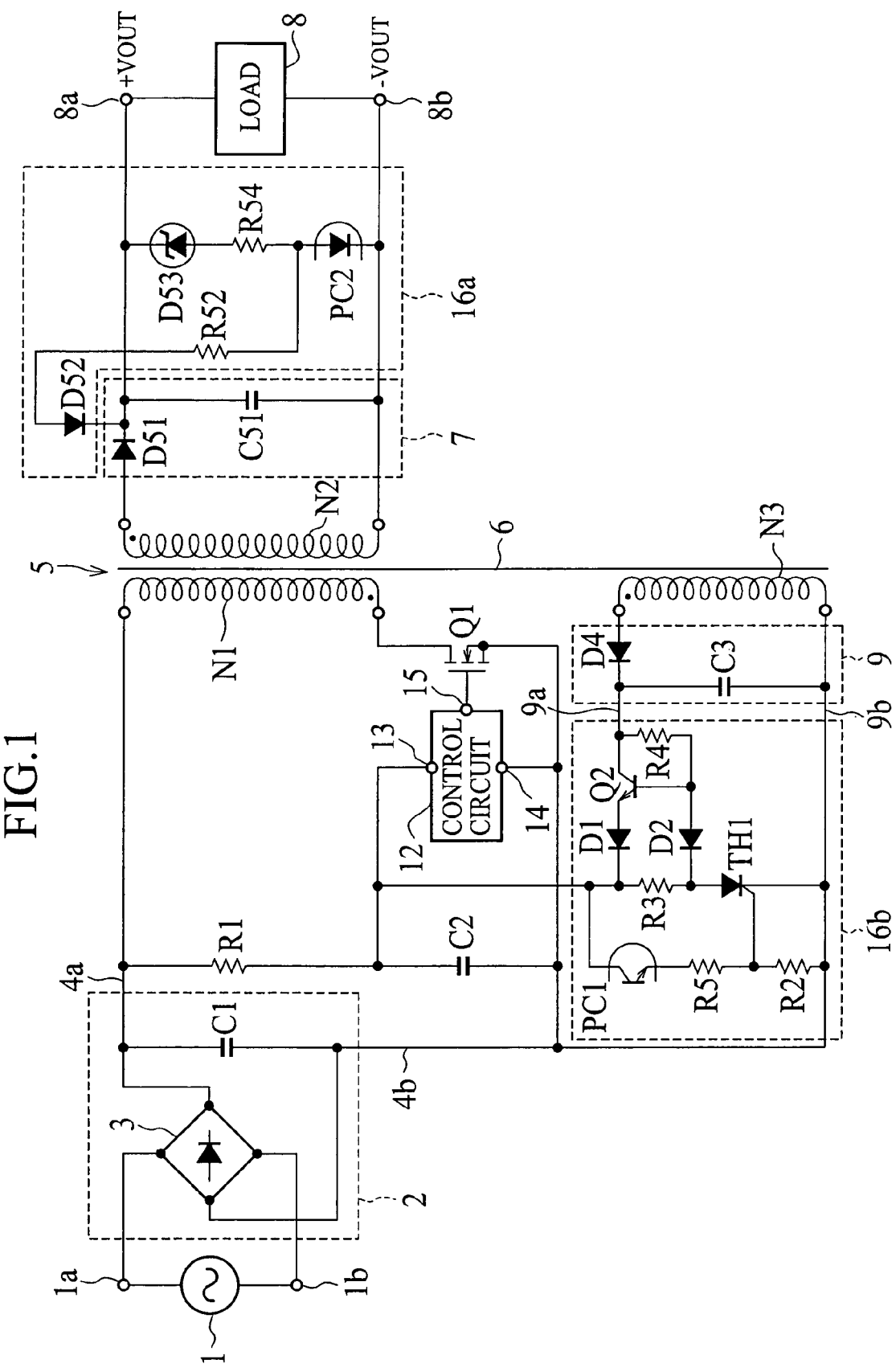
FIG. 1 is a circuit diagram showing a configuration of a power supply device of a first embodiment.

FIG. 1 is a circuit diagram showing a configuration of a power supply device of a first embodiment.

This power supply device has an input-stage rectifying/smoothing circuit 2 connected to a commercial alternating current power supply through alternating current input terminals 1a and 1b. The rectifying/smoothing circuit 2 is formed of a diode bridge rectifying circuit 3 and an input-stage smoothing capacitor C1. Input terminals of the diode bridge rectifying circuit 3 are connected to the alternating current input terminals 1a and 1b, and output terminals thereof are connected to a pair of direct current lines 4a and 4b. The smoothing capacitor C1 is connected between the direct current lines 4a and 4b. The rectifying/smoothing circuit 2 converts an alternating current voltage applied from the alternating current power supply 1 through the alternating current input terminals 1a and 1b into a direct current voltage.

Between the direct current lines 4a and 4b, a switch Q1 formed of a field-effect transistor is connected through a primary winding N1 of a transformer 5 for the purpose of stabilizing an output voltage of the rectifying/smoothing circuit 2 or converting a level thereof.

The transformer 5 has a secondary winding N2 electromagnetically coupled to the primary winding N1 through a core 6, and an auxiliary winding N3. The secondary winding N2 is connected to a load 8 through an output-stage rectifying/smoothing circuit 7. The rectifying/smoothing circuit 7 is formed of a rectifying diode D51 and a smoothing capacitor C51. The smoothing capacitor C51 is connected in parallel to the secondary winding N2 through the rectifying diode D51. Polarities of the secondary winding N2 and the rectifying diode D51 are determined such that the rectifying diode D51 conducts during a period while the switch Q1 is being turned off. A pair of direct current output terminals 8a and 8b for connecting the load 8 are connected to both ends of the smoothing capacitor C51. The rectifying/smoothing circuit 7 converts a voltage induced in the secondary winding N2 into a direct current voltage, and outputs the direct current voltage to the pair of direct current output terminals 8a and 8b. Note that a configuration can also be adopted such that the rectifying diode D51 conducts during a period while the switch Q1 is being turned on. The rectifying/smoothing circuit 2, the transformer 5 and the switch Q1 at the input stage and the rectifying/smoothing circuit 7 at the output stage correspond to a main circuit of the present invention.

Moreover, a first circuit 16a which constitutes a part of an overheat and overvoltage protection device is provided on an output side of the rectifying/smoothing circuit 7. The first circuit 16a is composed of: a first series circuit including a zener diode D53, a resistor R54 and a light-emitting diode PC2; and a second series circuit including a small-signal Schottky barrier diode D52 and a resistor R52 both being connected in parallel to the zener diode D53 and the resistor R54, between the pair of direct current output terminals 8a and 8b. The light-emitting diode PC2 corresponds to a light-emitting element of the present invention, and is a part of a photo-coupler.

As well known, the Schottky barrier diode D52 is formed of a silicon or group 3–5 compound semiconductor and a Schottky barrier electrode, and has rectifying characteristics by a Schottky barrier. A cathode of this Schottky barrier diode D52 is connected to a positive-voltage output terminal (that is, the direct current output terminal 8a) of the rectifying/smoothing circuit 7 so as to be reverse biased, and an anode thereof is connected to a negative-voltage output terminal (that is, the direct current output terminal 8b) of the rectifying/smoothing circuit 7 through the resistor R52 and the light-emitting diode PC2.

Figure 2:
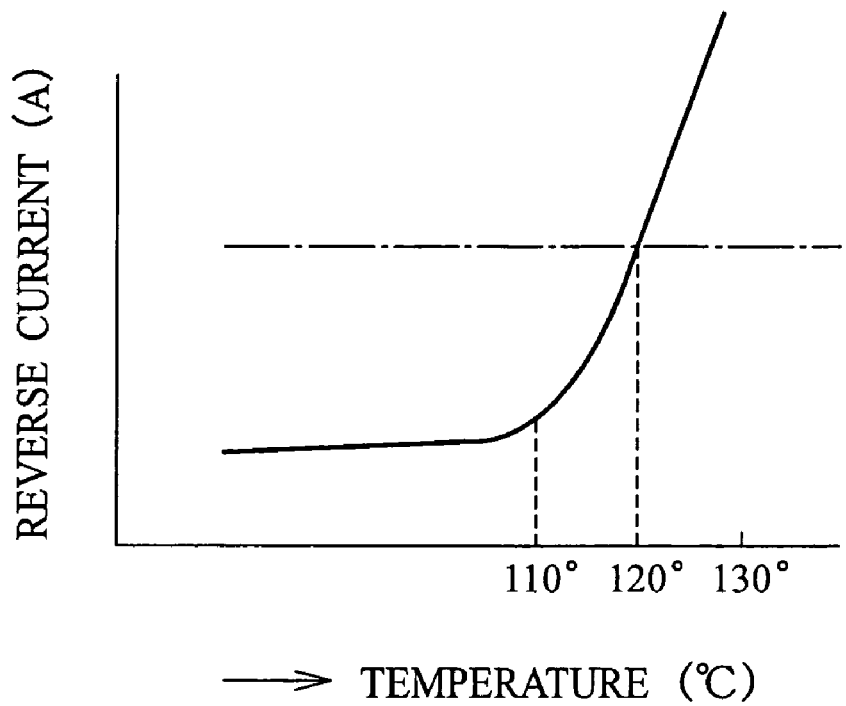
FIG. 2 is a characteristic chart showing a relationship between temperature and reverse current of a Schottky barrier diode used in the power supply device of the first embodiment.

The present invention has been made by focusing attention on the fact that a reverse leakage current of the Schottky barrier diode D52, that is, a reverse current Ir is radically increased as shown in FIG. 2 within a specific temperature range, for example, of 110 to 130° C. The specific temperature range where the reverse current Ir of the Schottky barrier diode D52 is radically increased corresponds to a temperature at which overheat protection is started. In order to prevent smoking and firing of the power supply device, it is desirable to detect a temperature slightly lower than a temperature at which there is a possibility of occurrences of the smoking and the firing, and to stop an operation of the power supply device. 110 to 130° C. that is the specific temperature range where the reverse current Ir of the Schottky diode D52 is radically varied is a desirable value as a temperature for preventing the smoking and the firing.

Figure 3:
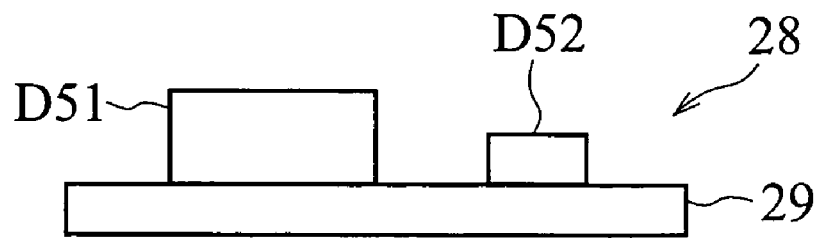
FIG. 3 is a front view schematically showing a composite part of the Schottky barrier diode and a rectifying diode, which is used in the power supply device of the first embodiment.

The Schottky barrier diode D52 is placed at an arbitrary place, or at a place that may be overheated or nearby in an inside of a case of the power supply device. In the first embodiment, the Schottky barrier diode D52 is thermally coupled to the rectifying diode D51 through which a main current of the power supply device flows. Specifically, as shown in FIG. 3, the Schottky barrier diode D52 and the rectifying circuit D51 are mechanically integrated with each other with a highly thermal conductive support 29, and constitute a composite part 28. Note that the Schottky barrier diode D52 and the rectifying diode D51 may be integrated with each other by an insulating enclosure. Moreover, the composite part 28 may be configured by use of the well-known TO-220 or TO-3P package.

A rectifying/smoothing circuit 9 for a control power supply is connected to the auxiliary winding N3 of the transformer 5. This rectifying/smoothing circuit 9 is formed of a rectifying diode D4 and a smoothing capacitor C3. The smoothing capacitor C3 is connected in parallel to the auxiliary winding N3 through the rectifying diode D4. Note that polarities of the rectifying diode D4 and the auxiliary winding N3 are determined such that the rectifying diode D4 conducts during a period while the switch Q1 is being turned off.

In order to control the switch Q1 to turn on and off, a control circuit 12 is connected to a control terminal (gate) of the switch Q1. The control circuit 12 has a first power supply terminal 13 and a second power supply terminal 14, to which a control power supply voltage is supplied, and an output terminal 15 which outputs a PWM (pulse with modulation) control signal, and the PWM control signal from the output terminal 15 is supplied to the control terminal of the switch Q1.

A capacitor C2 for the control power supply is provided in order to supply a direct current voltage to the control circuit 12, and one end and the other end of the capacitor C2 for the control power supply are connected to the first power supply terminal 13 and second power supply terminal 14 of the control circuit 12, respectively. The capacitor C2 for the control power supply is connected between the pair of direct current lines 4a and 4b through a starting resistor R1 which functions as a charging circuit at a starting time. The rectifying/smoothing circuit 9 which functions as a charging circuit after the start of the capacitor C2 for the control power supply is connected in parallel to the capacitor C2 for the control power supply through a transistor Q2 and a diode D1, which are included in a second circuit 16b constituting another part of the overheat and overvoltage protection device.

The second circuit 16b is formed of a phototransistor PC1, a thyristor TH1, the transistor Q2, the diode D1, a diode D2, a resistor R2, a resistor R3, a resistor R4 and a resistor R5. The phototransistor PC1 corresponds to a light-receiving element of the present invention, and is another part of the photo-coupler. The light-emitting diode PC2 of the first circuit 16a and the phototransistor PC1 of the second circuit 16b are optically coupled to each other. Moreover, the thyristor TH1 corresponds to a control element of the present invention, and has a function to maintain conduction.

One main terminal (anode) of the thyristor TH1 is connected through the resistor R3 to the one end of the capacitor C2 for the control power supply and the first power supply terminal 13 of the control circuit 12. The other main terminal (cathode) of the thyristor TH1 is connected to the other end of the capacitor C2 for the control power supply and the second power supply terminal 14 of the control circuit 12. A collector of the npn transistor Q2 which functions as an overheat-protection auxiliary switch and a constant-voltage control element is connected to a direct current line 9a, an emitter thereof is connected through the diode D1 to the one end of capacitor C2 for the control power supply, and a base thereof is connected through the resistor R4 to the direct current line 9a. When a voltage between a pair of the direct current line 9a of the rectifying/smoothing circuit 9 and a direct current line 9b thereof is higher than a voltage of the capacitor C2 for the control power supply, the transistor Q2 and the diode D1 conduct, and a charging current flows through the capacitor C2 for the control power supply. In order to associate the thyristor TH1 and the transistor Q2 with each other, the diode D2 is connected between the base of the transistor Q2 and the anode of the thyristor TH1. The transistor Q2 is turned off when the thyristor TH1 is turned on.

Next, operations of the power supply device of the first embodiment, which is thus configured, are described.

First, a general operation of the power supply device is described. When the alternating current power supply 1 is connected to the alternating current input terminals 1a and 1b, or when a power supply switch (not shown) is turned on in a state where the alternating current power supply 1 is connected thereto, the capacitor C2 for the control power supply is charged through the starting resistor R1. When the voltage of the capacitor C2 for the control power supply rises to a predetermined value, the supply of the PWM control signal is started from the control circuit 12 to the switch Q1. During the period while the switch Q1 is being turned on, the rectifying diode D51 and the rectifying diode D4 do not conduct, and energy is accumulated in the transformer 5. During the period while the switch Q1 is being turned off, the energy accumulated in the transformer 5 is released, and the smoothing capacitor C51 is charged through the rectifying diode D51, and the smoothing capacitor C3 is charged through the rectifying diode D4.

Although not shown, a well-known output voltage detection circuit which detects a direct current output voltage between the direct current output terminals 8a and 8b is provided, and the control circuit 12 forms such a PWM pulse that makes the output voltage constant in response to an output of the output voltage detection circuit, and supplies the PWM pulse to the switch Q1. Therefore, the voltage between the direct current output terminals 8a and 8b, that is, a voltage between both ends of the smoothing capacitor C51 becomes constant, and a voltage of the smoothing capacitor C3 of the rectifying/smoothing circuit 9 also becomes constant. When the voltage between both ends of the smoothing capacitor C3 becomes higher than the voltage between both ends of the capacitor C2 for the control power supply, the transistor Q2 as the auxiliary switch and the diode D1 conduct, and the capacitor C2 for the control power supply is charged with the output voltage of the rectifying/smoothing circuit 9.

Next, operations for the overheat protection are described. The Schottky barrier diode D52 is connected between the pair of direct current output terminals 8a and 8b through the resistor R52 and the light-emitting diode PC2, so as to be reverse biased. When temperatures of the rectifying diode D51 and the Schottky barrier diode D52 thermally coupled thereto are less than a predetermined temperature (for example, 120° C.), the reverse current Ir of the Schottky barrier diode D52 is small. Accordingly, a light output of the light-emitting diode PC2 is also weak, and the thyristor TH1 cannot be converted into a conductive state through the phototransistor PC1. Hence, the switch Q1 normally repeats on/off operations.

As opposed to this, when the temperature of the Schottky barrier diode D52 exceeds the predetermined temperature, the reverse current Ir becomes large, and the light output of the light-emitting diode PC2 becomes strong.

Thus, a current of the phototransistor PC1 is also increased, and a trigger current flows through the thyristor TH1. The trigger current of the thyristor TH1 is injected from a gate of the thyristor TH1 toward the cathode thereof through the phototransistor PC1, and the thyristor TH1 is turned on. As well known, once the thyristor TH1 is turned on, the thyristor TH1 maintains an on state until the current becomes equal to or less than a holding current.

When the thyristor TH1 is turned on based on overheat detection of the Schottky barrier diode D52, the diode D2 is forward biased and turns to an on state, and the transistor Q2 turns to an off state. Thus, the charging current which has been supplied from the rectifying/smoothing circuit 9 to the capacitor C2 for the control power supply is cut off. At the same time, the thyristor TH1 short-circuits both ends of the capacitor C2 for the control power supply through the resistor R3, and accordingly, charges of the capacitor C2 for the control power supply are emitted through the resistor R3 and the thyristor TH1. As a result of this, the voltage between both ends of the capacitor C2 for the control power supply is lowered, and a voltage between the first power supply terminal 13 and second power supply terminal 14 of the control circuit 12 is also lowered. Thus, it becomes impossible to turn on/off the switch Q1 by the control circuit 12, and switching of the direct current voltage from the rectifying/smoothing circuit 2 turns into a stopped state. By the operations described above, the overheat protection of the rectifying diode D51 is achieved.

The holding current continues to flow in the thyristor TH1 through the starting resistor R1, and accordingly, an overheat protection state is maintained until the alternating current terminals 1a and 1b are separated from the alternating current power supply 1, or until the power supply switch (not shown) is turned off. The thyristor TH1 is also turned off by such separation of the alternating current power supply 1 or such a turning-off operation of the power supply switch. If the overheat state is resolved, such an off state of the thyristor TH1 is maintained even though the supply of power from the alternating current power supply 1 is resumed. Accordingly, the overheat protection by the Schottky barrier diode D52 is made possible again.

Next, operations for the overvoltage protection are described. When the power supply device normally operates and the voltage between the direct current output terminals 8a and 8b is within a predetermined range, the zener diode D53 is non-conductive. Hence, the phototransistor PC1 is also non-conductive, and the trigger current does not flow through the thyristor TH1.

Meanwhile, when the voltage between the direct current output terminals 8a and 8b exceeds the predetermined range by some cause, the zener diode D53 conducts, and the current flows through the light-emitting diode PC2.

Thus, the light-emitting diode PC2 emit light, and accordingly, the phototransistor PC1 also conducts, and the trigger current flows through the thyristor TH1. As a result of this, the thyristor TH1 is turned on, the on/off operations of the switch Q1 are stopped, and the load 8 is protected from the overvoltage.

As described above, according to the power supply device of the first embodiment, the overheat protection can be achieved by using the small-signal Schottky barrier diode D52, which is relatively inexpensive, as a temperature detection element, and accordingly, cost reduction and downsizing of the power supply device can be achieved.

Moreover, a discharge circuit for the capacitor C2 for the control power supply is formed by the thyristor TH1, and the transistor Q2 is turned off to cut off the charging current. Accordingly, rapid overheat protection can be achieved.

Furthermore, the light-emitting diode PC2 is shared to realize an overheat and overvoltage protection circuit. Accordingly, cost reduction to a great extent can be achieved. Moreover, the rectifying diode D51 and the Schottky barrier diode D52 are composed as the integrated composite part, and accordingly, the thermal coupling of both can be made dense, and both can be thermally coupled to each other in an accurate manner.

(Second Embodiment)

A power supply device of a second embodiment is one in which the above-described power supply device of the first embodiment is improved.

In the power supply device of the first embodiment, it is conceived that the detection of the reverse current Ir of the Schottky barrier diode D52 is performed on the primary side through the photo-coupler (the light-emitting diode PC2 and the phototransistor PC1).

Therefore, a detection result of the reverse current Ir of the Schottky barrier diode D52 is greatly affected by a current transfer ratio (CTR) of the photo-coupler. In general, variations of the CTR of the photo-coupler are large. Therefore, in the power supply device of the first embodiment, which is configured as described above, an overheat protection level (latching temperature) is varied. Moreover, the CTR also differs depending on the temperature and a forward current, and accordingly, it becomes extremely difficult to set the latching temperature.

Moreover, in the power supply device of the first embodiment, the current which flows through the light-emitting diode PC2 becomes the sum of the reverse current Ir of the Schottky barrier diode D52 and the current which flows through the zener diode D53, and accordingly, an overvoltage protection level (latching voltage) is varied due to a change in the reverse current Ir of the Schottky barrier diode D52, which is caused by the temperature.

In order to resolve such a problem inherent in the power supply device of the first embodiment, in the power supply device of the second embodiment, the overheat protection circuit is configured so as not to be affected by the CTR of the photo-coupler, and moreover, a configuration is adopted, in which the reverse current Ir of the Schottky barrier diode D52 which detects the overheat does not affect the current flowing through the zener diode D53 which detects the overvoltage of the overvoltage protection circuit.

Figure 4:
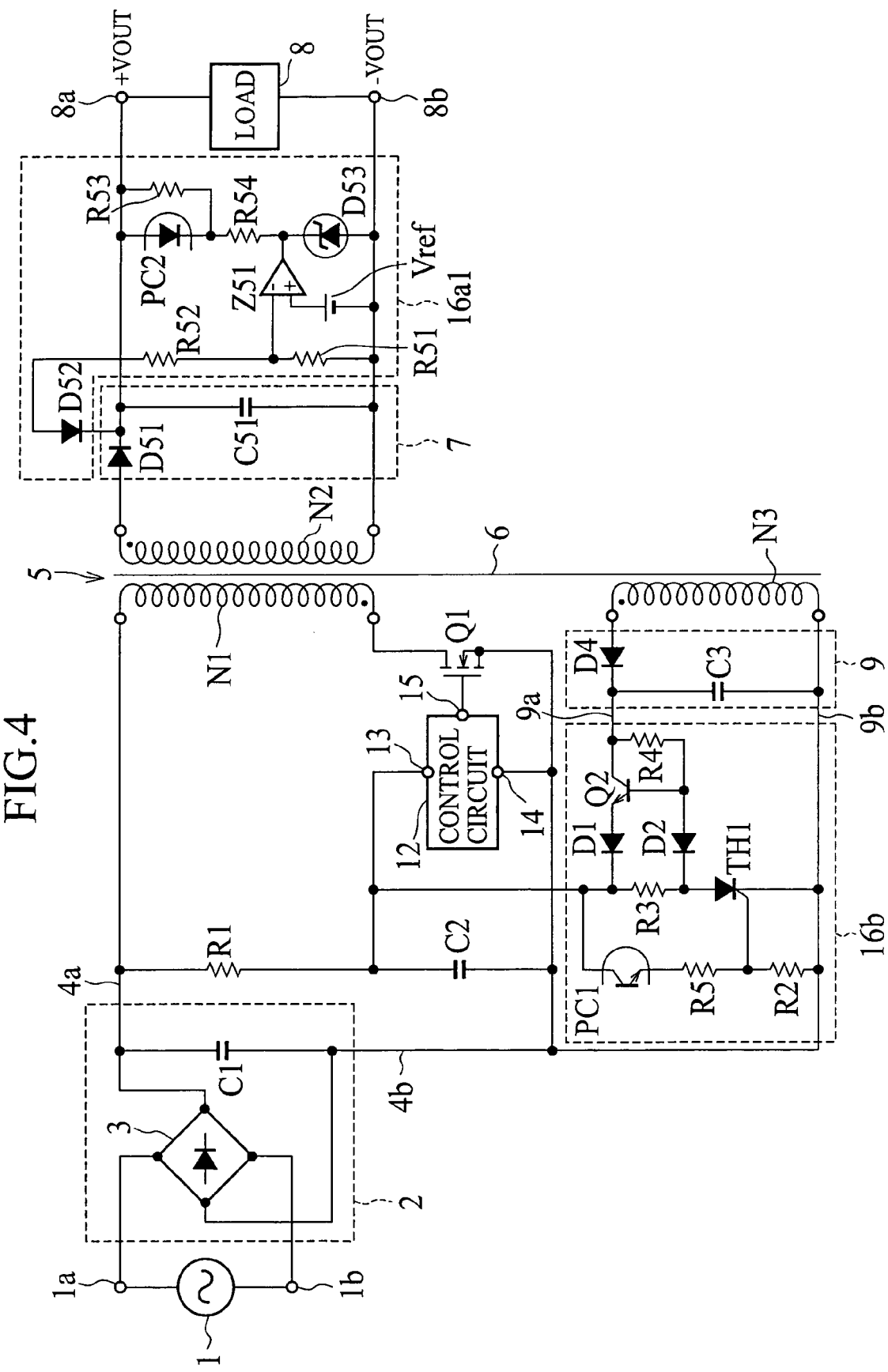
FIG. 4 is a circuit diagram showing a configuration of a power supply device of a second embodiment.

FIG. 4 is a circuit diagram showing a configuration of the power supply device of the second embodiment. Note that the same reference numerals and symbols are added to the same or corresponding portions as or to those of the power supply device of the first embodiment, and description thereof is omitted or simplified.

In the power supply device of the second embodiment, a configuration and operation of a first circuit 16a1 differ from those of the first circuit 16a of the first embodiment. Specifically, the first circuit 16a1 is composed of: a series circuit formed of the Schottky barrier diode D52, the resistor R52 and a resistor R51, which are connected in series between the direct current output terminals 8a and 8b; a series circuit formed of the light-emitting diode PC2, the resistor R54 and the zener diode D53, which are connected in series between the direct current output terminals 8a and 8b; a resistor R53 connected in parallel to the light-emitting diode PC2; and a comparator Z51.

An inverting input terminal (−) of the comparator Z51 is connected to a connecting point of the resistor R52 and the resistor R51, and a non-inverting input terminal (+) thereof is connected to a power supply which supplies a reference voltage Vref. Moreover, an output terminal of the comparator Z51 is connected to a connecting point of the resistor R54 and the zener diode D53. The cathode of the Schottky barrier diode D52 is connected to the direct current output terminal 8a such that the Schottky barrier diode D52 is reverse biased. The light-emitting diode PC2 is a part of the photo-coupler, and corresponds to the light-emitting element of the present invention.

Next, operations of the power supply device of the second embodiment are described. When the temperature of the Schottky barrier diode D52 rises and the reverse current Ir is increased, a voltage which occurs in the resistor R51 is increased, and a voltage applied to the inverting input terminal of the comparator Z51 is increased. When the voltage applied to the inverting input terminal becomes equal to or more than the reference voltage Vref, a potential of the output terminal of the comparator Z51 is set to an L level (low level), and the comparator Z51 turns to a state of drawing a current. Thus, the current flows through the light-emitting diode PC2, which then emits light, and by operations similar to those of the power supply device of the first embodiment, the thyristor TH1 is turned on, and the operation of the control circuit 12 is stopped.

In this first circuit 16a1, a current does not flow through the light-emitting diode PC2 when the voltage which occurs in the resistor R51 is smaller than the reference voltage Vref, and a constant current determined by the resistor R54 flows therethrough when the voltage is equal to or more than the reference voltage Vref. Hence, if a resistance value of the resistor R54 is designed such that a current sufficient for turning on the thyristor TH1 flows through the phototransistor PC1, the variations of the latching temperature owing to the variations of the CTR are eliminated.

In the first circuit 16a1, when the voltage which occurs in the resistor R51 is smaller than the reference voltage Vref, the reverse current Ir of the Schottky barrier diode D52 does not flow into the light-emitting diode PC2. Hence, when functioning as the overvoltage protection circuit, the first circuit 16a1 is not affected by the reverse current Ir.

Moreover, the zener diode D53 flows the current through the light-emitting diode PC2 when the voltage between the direct current output terminals 8a and 8b becomes larger than a predetermined breakdown voltage.

As described above, according to the power supply device of the second embodiment, in addition to the effects by the above-described power supply device of the first embodiment, the overheat and overvoltage protection circuit is not affected by the CTR of the photo-coupler. Moreover, the reverse current Ir of the Schottky barrier diode D52 which detects the overheat does not affect the current flowing through the zener diode D53 which detects the overvoltage. Accordingly, the overheat protection level (latching temperature) and the overvoltage protection level (latching voltage) can be set accurately.

(Third Embodiment)

A power supply device of a third embodiment is one in which the comparator Z51 included in the first circuit 16a1 of the power supply device of the second embodiment is replaced by a transistor.

Figure 5:
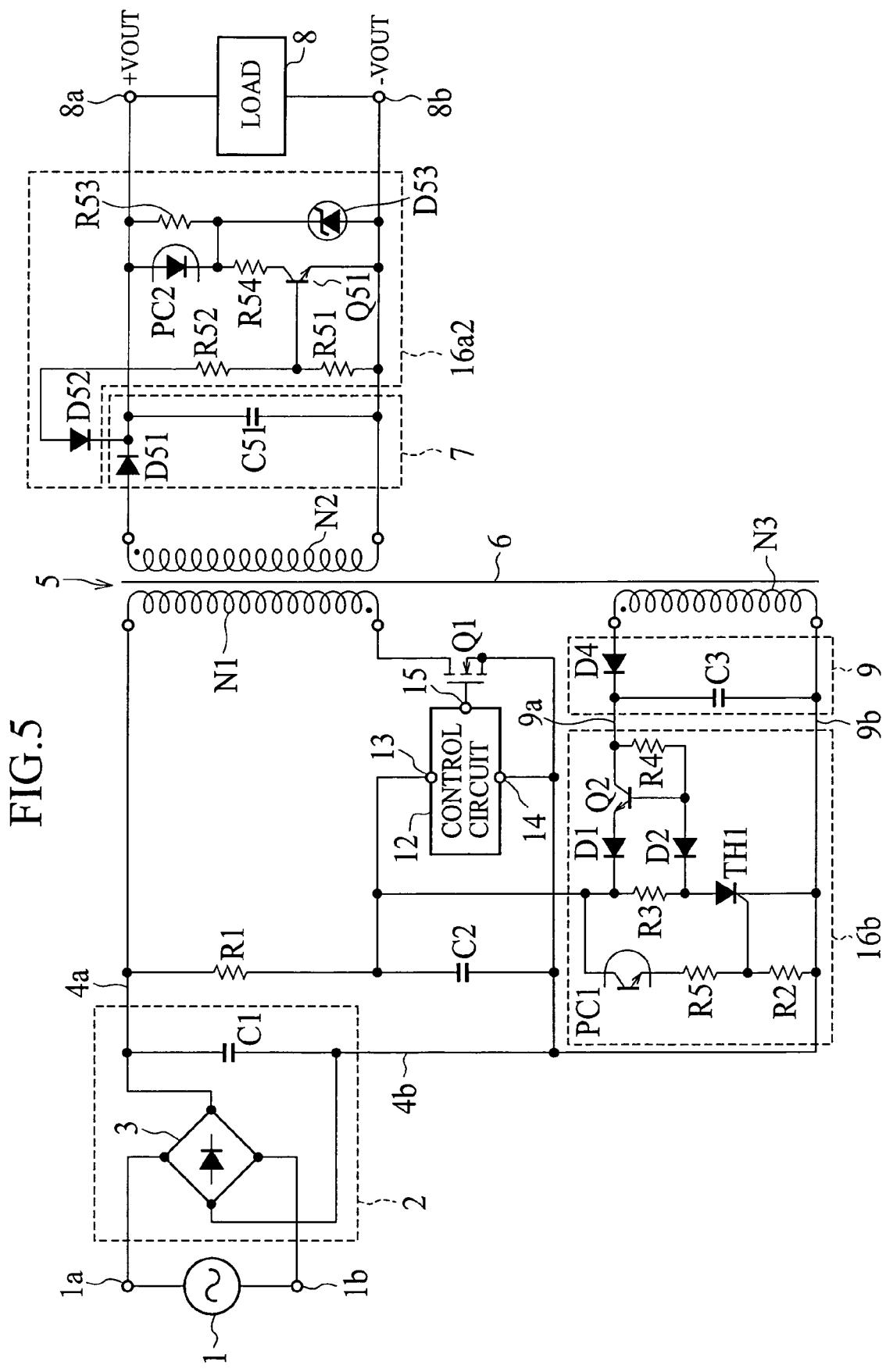
FIG. 5 is a circuit diagram showing a configuration of a power supply device of a third embodiment.

FIG. 5 is a circuit diagram showing a configuration of the power supply device of the third embodiment. Note that the same reference numerals and symbols are added to the same or corresponding portions as or to those of the power supply device of the second embodiment, and description thereof is omitted or simplified.

A first circuit 16a2 of the power supply device of the third embodiment is composed of: a series circuit formed of the Schottky barrier diode D52, the resistor R52 and the resistor R51, which are connected in series between the direct current output terminals 8a and 8b; a series circuit formed of the light-emitting diode PC2 and the zener diode D53, which are connected in series between the direct current output terminals 8a and 8b; and a series circuit formed of the resistor R53 connected in parallel to the light-emitting diode PC2, and the resistor R54 and an npn transistor Q51, which are connected in parallel to the zener diode D53. A base of the transistor Q51 is connected to the connecting point of the resistor R52 and the resistor R51. The cathode of the Schottky barrier diode D52 is connected to the direct current output terminal 8a such that the Schottky barrier diode D52 is reverse biased. The light-emitting diode PC2 is a part of the photo-coupler, and corresponds to the light-emitting element of the present invention.

Next, operations of the power supply device of the third embodiment are described. When the temperature of the Schottky barrier diode D52 rises and the reverse current Ir is increased, the voltage that occurs in the resistor R51 is increased. When this voltage becomes more than a threshold voltage between the base and emitter of the transistor Q51, the transistor Q51 is turned on. Thus, the current flows through the light-emitting diode PC2, which then emits light, and by the operations similar to those of the power supply device of the first embodiment, the thyristor TH1 is turned on, and the operation of the control circuit 12 is stopped.

In the first circuit 16a2, the transistor Q51 is turned off when the voltage which occurs in the resistor R51 is smaller than the threshold value between the base and emitter of the transistor Q51, and the reverse current Ir of the Schottky barrier diode D52 does not flow into the light-emitting diode PC2. Hence, when functioning as the overvoltage protection circuit, the first circuit 16a2 is not affected by the reverse current Ir.

Moreover, the zener diode D53 flows the current through the light-emitting diode PC2 when the voltage between the direct current output terminals 8a and 8b becomes larger than the predetermined breakdown voltage.

As described above, according to the power supply device of the third embodiment, in addition to effects similar to those of the above-described power supply device of the second embodiment, it is not necessary to generate the reference voltage Vref because the transistor Q51 is used instead of the comparator Z51, and a configuration of the circuit is simplified.

Note that an FET, a shunt regulator and the like can be used instead of the transistor Q51. In this case also, functions and effects, which are similar to those in the case of using the above-described transistor Q51, are exerted.

(Fourth Embodiment)

A power supply device of a fourth embodiment is one, in which the transistor Q51 included in the first circuit 16a2 of the power supply device of the third embodiment is removed, and the light-emitting diode PC2 is connected to a negative voltage side (direct current output terminal 8b side).

Figure 6:
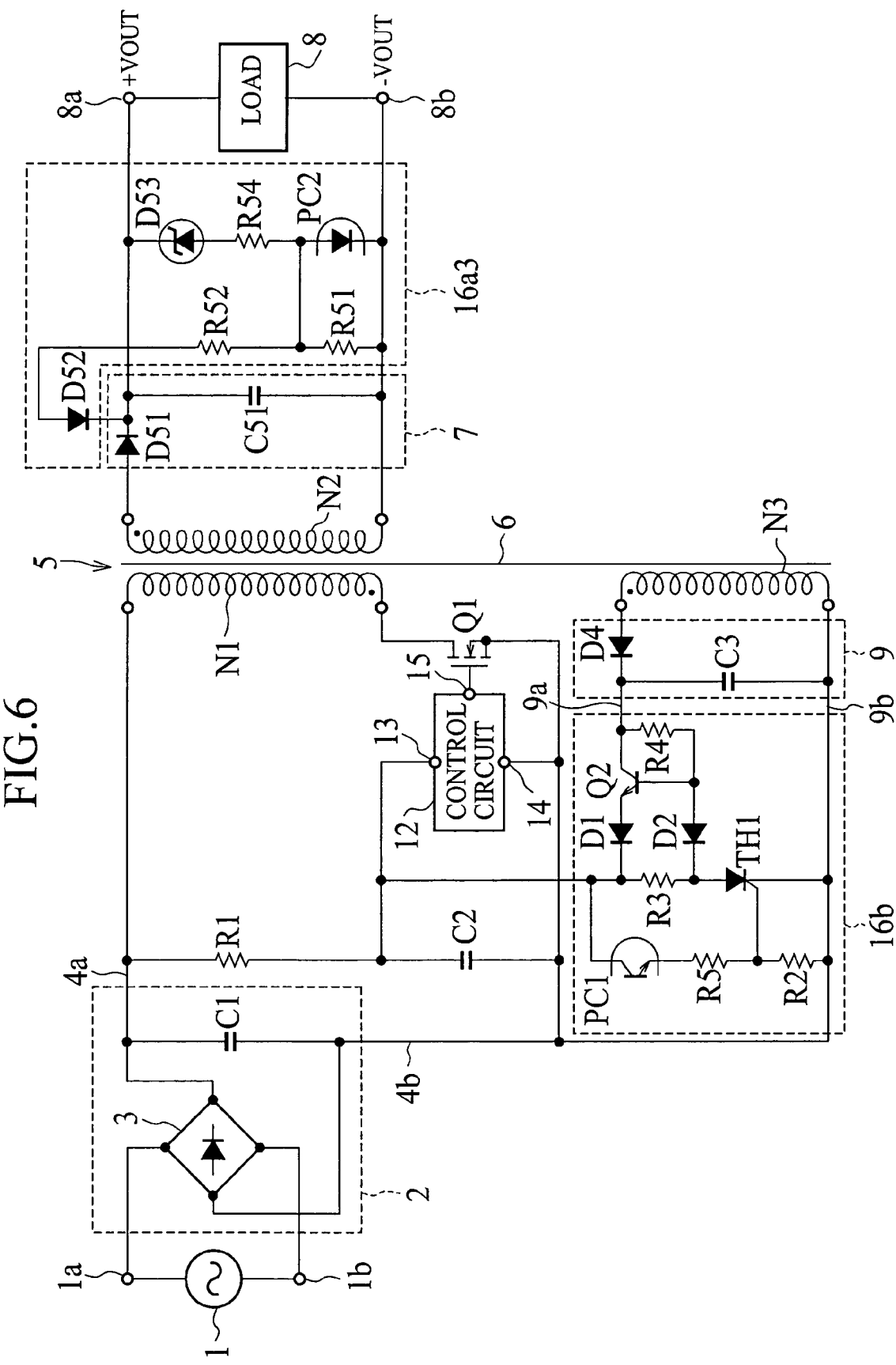
FIG. 6 is a circuit diagram showing a configuration of a power supply device of a fourth embodiment.

FIG. 6 is a circuit diagram showing a configuration of the power supply device of the fourth embodiment. Note that the same reference numerals and symbols are added to the same or corresponding portions as or to those of the power supply device of the third embodiment, and description thereof is omitted or simplified.

A first circuit 16a3 of the power supply device of the fourth embodiment is composed of: a series circuit formed of the Schottky barrier diode D52, the resistor R52 and the resistor R51, which are connected in series between the direct current output terminals 8a and 8b; and a series circuit formed of the zener diode D53, the resistor R54 and the light-emitting diode PC2, which are connected in series between the direct current output terminals 8a and 8b. The connecting point of the resistor R52 and the resistor R51 is connected to a connecting point of the resistor R54 and the light-emitting diode PC2. The cathode of the Schottky barrier diode D52 is connected to the direct current output terminal 8a such that the Schottky barrier diode D52 is reverse biased. The light-emitting diode PC2 is a part of the photo-coupler, and corresponds to the light-emitting element of the present invention.

Next, operations of the power supply device of the fourth embodiment are described. When the temperature of the Schottky barrier diode D52 rises to increase the reverse current Ir, and the voltage that occurs in the resistor R51 becomes equal to or more than a forward threshold voltage of the light-emitting diode PC2, the current flows through the light-emitting diode PC2, which then emits light. Thus, by operations similar to those of the power supply device of the first embodiment, the thyristor TH1 is turned on, and the operation of the control circuit 12 is stopped.

Moreover, the zener diode D53 flows the current through the light-emitting diode PC2 when the voltage between the direct current output terminals 8a and 8b becomes larger than the predetermined breakdown voltage.

According to the power supply device of the fourth embodiment, an active element such as the comparator and the transistor is not required, and accordingly, further cost reduction and downsizing of the power supply device can be achieved.

(Fifth Embodiment)

A power supply device of a fifth embodiment is one in which a diode D54 is inserted between the connecting point of the resistor R52 and the resistor R51 and the connecting point of the resistor R54 and the light-emitting diode PC2 in the first circuit 16a3 of the power supply device of the fourth embodiment.

Even the first circuit 16a3 of the above-described power supply device of the fourth embodiment can be shared as the overvoltage protection circuit because the zener diode D53 and the resistor R54 are connected to the light-emitting diode PC2 from the direct current output terminal 8a side. However, the reverse current Ir of the Schottky barrier diode D52 always flows through the resistor R51, and accordingly, there is a problem that the overvoltage protection level (latching voltage) is varied depending on the temperature of the Schottky barrier diode D52.

Specifically, when the direct current voltage outputted from the pair of direct current output voltage terminals 8a and 8b turns to an overvoltage state, and the zener diode D53 is turned on, all the current flowing through the zener diode D53 flows to the resistor R52 when the voltage which occurs in the resistor R51 is equal to or less than the forward threshold voltage of the light-emitting diode PC2. Hence, the voltage which occurs in the resistor R51 is determined by the sum of the reverse current Ir of the Schottky barrier diode D52 and the current flowing through the zener diode D53, and accordingly, the overvoltage protection level (latching voltage) is varied depending on the temperature of the Schottky barrier diode D52. The power supply device of the fifth embodiment is one that resolves this problem.

Figure 7:
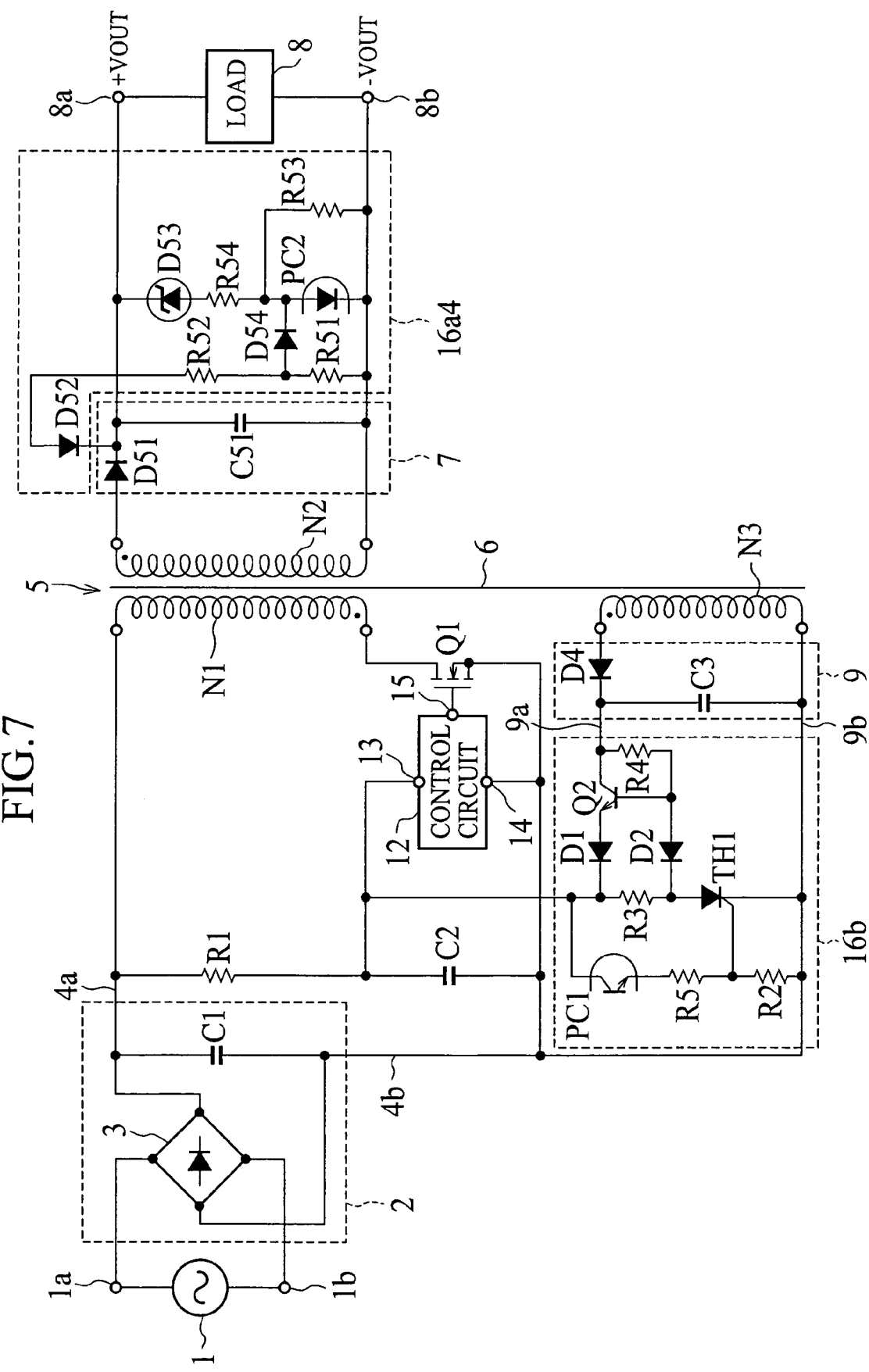
FIG. 7 is a circuit diagram showing a configuration of a power supply device of a fifth embodiment.

FIG. 7 is a circuit diagram showing a configuration of the power supply device of the fifth embodiment. Note that the same reference numerals and symbols are added to the same or corresponding portions as or to those of the power supply device of the fourth embodiment, and description thereof is omitted or simplified.

A first circuit 16a4 of the power supply device of the fifth embodiment is composed of: a series circuit formed of the Schottky barrier diode D52, the resistor R52 and the resistor R51, which are connected in series between the direct current output terminals 8a and 8b; a series circuit formed of the zener diode D53, the resistor R4 and the light-emitting diode PC2, which are connected in series between the direct current output terminals 8a and 8b; the diode D54, in which an anode is connected to the connecting point of the resistor R52 and the resistor R51, and a cathode is connected to the connecting point of the resistor R4 and the light-emitting diode PC2; and the resistor R53 connected in parallel to the light-emitting diode PC2. The cathode of the Schottky barrier diode D52 is connected to the direct current output terminal 8a such that the Schottky barrier diode D52 is reverse biased. The light-emitting diode PC2 is a part of the photo-coupler, and corresponds to the light-emitting element of the present invention.

Next, operations of the power supply device of the fifth embodiment are described. When the temperature of the Schottky barrier diode D52 rises to increase the reverse current Ir, and the voltage that occurs in the resistor R51 becomes equal to or more than the sum of forward threshold voltages of the diode D54 and the light-emitting diode PC2, the current flows through the light-emitting diode PC2, which then emits light. Thus, by operations similar to those of the power supply device of the first embodiment, the thyristor TH1 is turned on, and the operation of the control circuit 12 is stopped.

Moreover, when the direct current voltage outputted from the pair of direct current output voltage terminals 8a and 8b turns to the overvoltage state, and the zener diode D53 is turned on, the current flows in the resistor R53 through the zener diode D53. When the voltage that occurs in this resistor R53 becomes equal to or more than the forward threshold voltage of the light-emitting diode PC2, the current flows through the light-emitting diode PC2, which then emits light. Thus, by operations similar to those of the power supply device of the first embodiment, the thyristor TH1 is turned on, and the operation of the control circuit 12 is stopped.

Moreover, the zener diode D53 flows the current through the light-emitting diode PC2 when the voltage between the direct current output terminals 8a and 8b becomes larger than the predetermined breakdown voltage.

As described above, according to the power supply device of the fifth embodiment, when the voltage which occurs in the resistor R51 is equal to or less than the sum of the forward threshold voltages of the diode D54 and the light-emitting diode PC2, the reverse current Ir of the Schottky barrier diode D52 does not flow through the light-emitting diode PC2. Accordingly, when functioning as the overvoltage protection circuit, the first circuit 16a4 is not affected by the reverse current Ir.

(Sixth Embodiment)

A power supply device of a sixth embodiment is one in which the Schottky barrier diode D52 included in the first circuit 16a1 of the power supply device of the second embodiment is thermally coupled to a resistor R55 inserted into an output line of the rectifying/smoothing circuit 7, instead of being thermally coupled to the rectifying diode D52.

Figure 8:
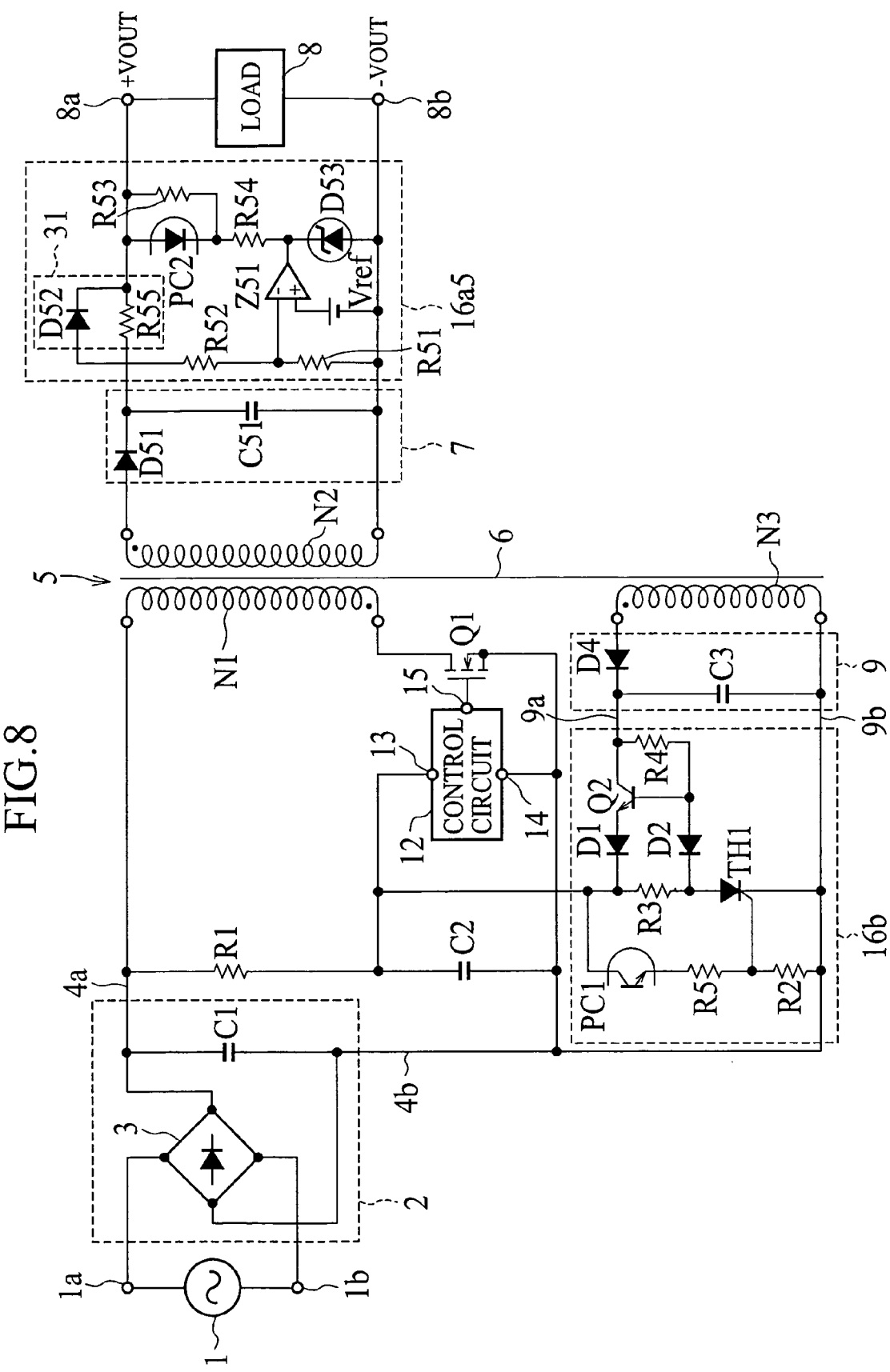
FIG. 8 is a circuit diagram showing a configuration of a power supply device of a sixth embodiment.

FIG. 8 is a circuit diagram showing a configuration of the power supply device of the sixth embodiment. Note that the same reference numerals and symbols are added to the same or corresponding portions as or to those of the power supply device of the second embodiment, and description thereof is omitted or simplified.

The resistor R55 is connected in series between one end of the smoothing capacitor C51 and the positive-voltage direct current output terminal 8a. Hence, the main current of the power supply device, that is, a load current flows through the resistor R55. Although not shown in FIG. 8, a pair of current detection lines are connected to both terminals of the resistor R55, and the pair of current detection lines are connected to the control circuit 12. The control circuit 12 controls the switch Q1 to reduce the current outputted from the pair of direct current output terminals 8a and 8b to a predetermined value or less when the current flowing through the resistor R55 becomes larger than a predetermined value.

The Schottky barrier diode D52 is thermally coupled to the resistor R55. Accordingly, when the resistor R55 turns to the overheat state in a similar way to the case where the rectifying diode D51 in the power supply device (refer to FIG. 4) of the second embodiment turns to the overheat state, the thyristor TH1 conducts, the switch Q1 turns to the off state, and the overheat protection is attained.

Figure 9:
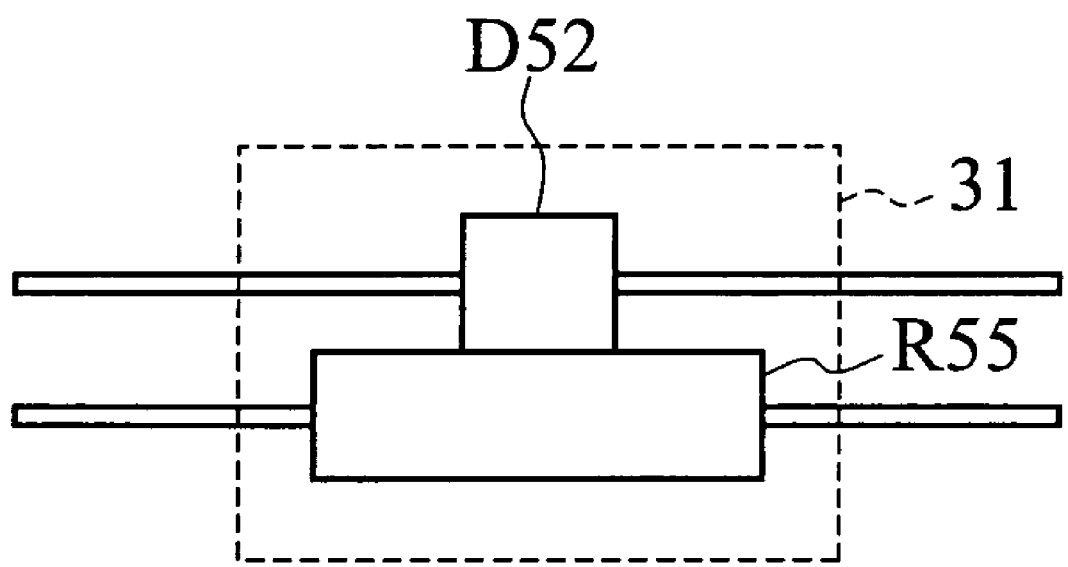
FIG. 9 is a front view schematically showing a composite part of a Schottky barrier diode and a resistor, which is used in the power supply device of the sixth embodiment.

The Schottky barrier diode D52 and the resistor R55 are composed as a mechanically-integrated composite part 31 as shown in FIG. 9 in order to make thermal coupling thereof accurate and dense.

Note that the Schottky barrier diode D52 and the resistor R55 may be integrated with each other by the insulating enclosure. Moreover, the composite part 31 may be configured by use of the well-known TO-220 or TO-3P package.

According to the power supply device of the sixth embodiment, functions and effects, which are similar to those of the power supply device of the second embodiment, are exerted.

(Seventh Embodiment)

A power supply device of a seventh embodiment is one in which the Schottky barrier diode D52 included in the first circuit 16a2 of the power supply device of the third embodiment is thermally coupled to the resistor R55 inserted into the output line of the rectifying/smoothing circuit 7, instead of being thermally coupled to the rectifying diode D51.

Figure 10:
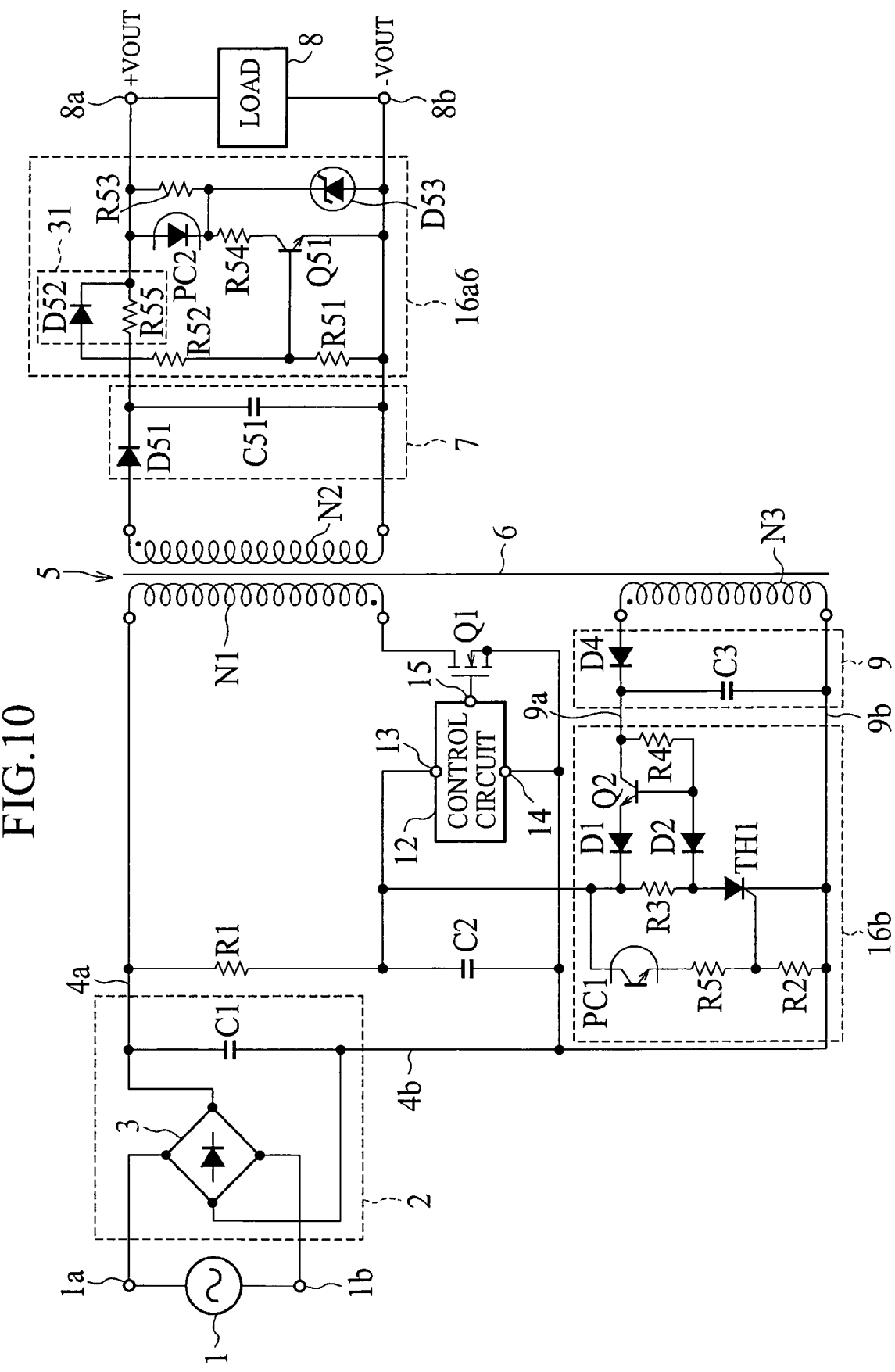
FIG. 10 is a circuit diagram showing a configuration of a power supply device of a seventh embodiment.

FIG. 10 is a circuit diagram showing a configuration of the power supply device of the seventh embodiment. Note that the same reference numerals and symbols are added to the same or corresponding portions as or to those of the power supply device of the third embodiment, and description thereof is omitted or simplified.

The resistor R55 is connected in series between the one end of the smoothing capacitor C51 and the positive-voltage direct current output terminal 8a. Hence, the main current of the power supply device, that is, the load current flows through the resistor R55. Although not shown in FIG. 10, the pair of current detection lines are connected to both terminals of the resistor R55, and the pair of current detection lines are connected to the control circuit 12. The control circuit 12 controls the switch Q1 to reduce the current outputted from the pair of direct current output terminals 8a and 8b to a predetermined value or less when the current flowing through the resistor R55 becomes larger than a predetermined value.

The Schottky barrier diode D52 is thermally coupled to the resistor R55. Accordingly, when the resistor R55 turns to the overheat state in a similar manner to the case where the rectifying diode D51 in the power supply device (refer to FIG. 5) of the third embodiment turns to the overheat state, the thyristor TH1 conducts, the switch Q1 turns to the off state, and the overheat protection is attained.

In the power supply device of the seventh embodiment also, the Schottky barrier diode D52 and the resistor R55 can be composed as the mechanically-integrated composite part 31 as shown in FIG. 9 as in the sixth embodiment. According to the power supply device of the seventh embodiment, functions and effects, which are similar to those of the power supply device of the third embodiment, are exerted.

(Eighth Embodiment)

A power supply device of an eighth embodiment is one in which the Schottky barrier diode D52 included in the first circuit 16a3 of the power supply device of the fourth embodiment is thermally coupled to the resistor R55 inserted into the output line of the rectifying/smoothing circuit 7, instead of being thermally coupled to the rectifying diode D51.

Figure 11:
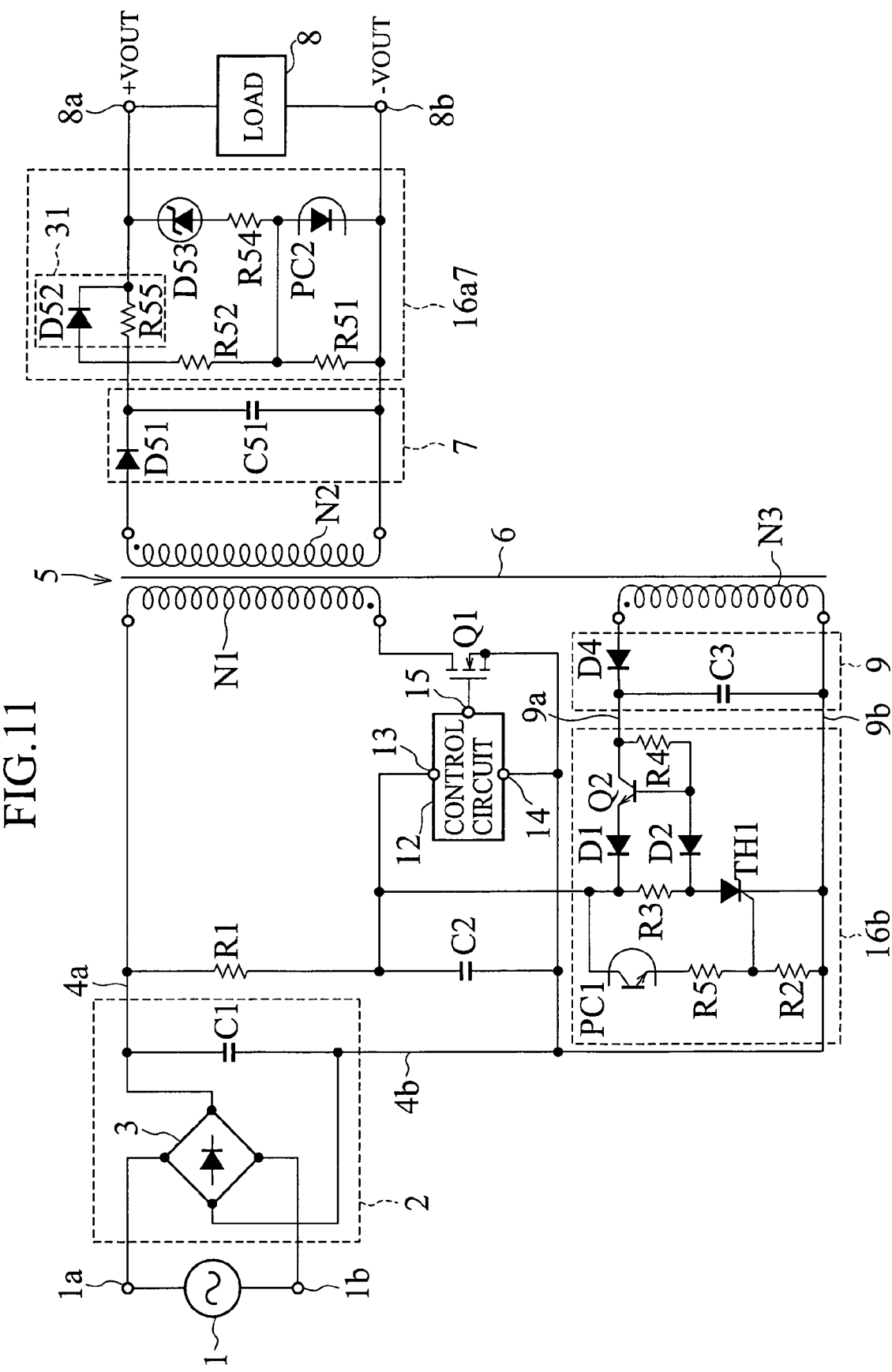
FIG. 11 is a circuit diagram showing a configuration of a power supply device of an eight embodiment.

FIG. 11 is a circuit diagram showing a configuration of the power supply device of the eighth embodiment. Note that the same reference numerals and symbols are added to the same or corresponding portions as or to those of the power supply device of the fourth embodiment, and description thereof is omitted or simplified.

The resistor R55 is connected in series between the one end of the smoothing capacitor C51 and the positive-voltage direct current output terminal 8a. Hence, the main current of the power supply device, that is, the load current flows through the resistor R55. Although not shown in FIG. 11, the pair of current detection lines are connected to both terminals of the resistor R55, and the pair of current detection lines are connected to the control circuit 12. The control circuit 12 controls the switch Q1 to reduce the current outputted from the pair of direct current output terminals 8a and 8b to a predetermined value or less when the current flowing through the resistor R55 becomes larger than a predetermined value.

The Schottky barrier diode D52 is thermally coupled to the resistor R55. Accordingly, when the resistor R55 turns to the overheat state in a similar manner to the case where the rectifying diode D51 in the power supply device (refer to FIG. 6) of the fourth embodiment turns to the overheat state, the thyristor TH1 conducts, the switch Q1 turns to the off state, and the overheat protection is attained.

In the power supply device of the eighth embodiment also, the Schottky barrier diode D52 and the resistor R55 can be composed as the mechanically-integrated composite part 31 as shown in FIG. 9 as in the sixth embodiment. According to the power supply device of the eighth embodiment, functions and effects, which are similar to those of the power supply device of the fourth embodiment, are exerted.

(Ninth Embodiment)

A power supply device of a ninth embodiment is one in which the Schottky barrier diode D52 included in the first circuit 16a4 of the power supply device of the fifth embodiment is thermally coupled to the resistor R55 inserted into the output line of the rectifying/smoothing circuit 7, instead of being thermally coupled to the rectifying diode D51.

Figure 12:
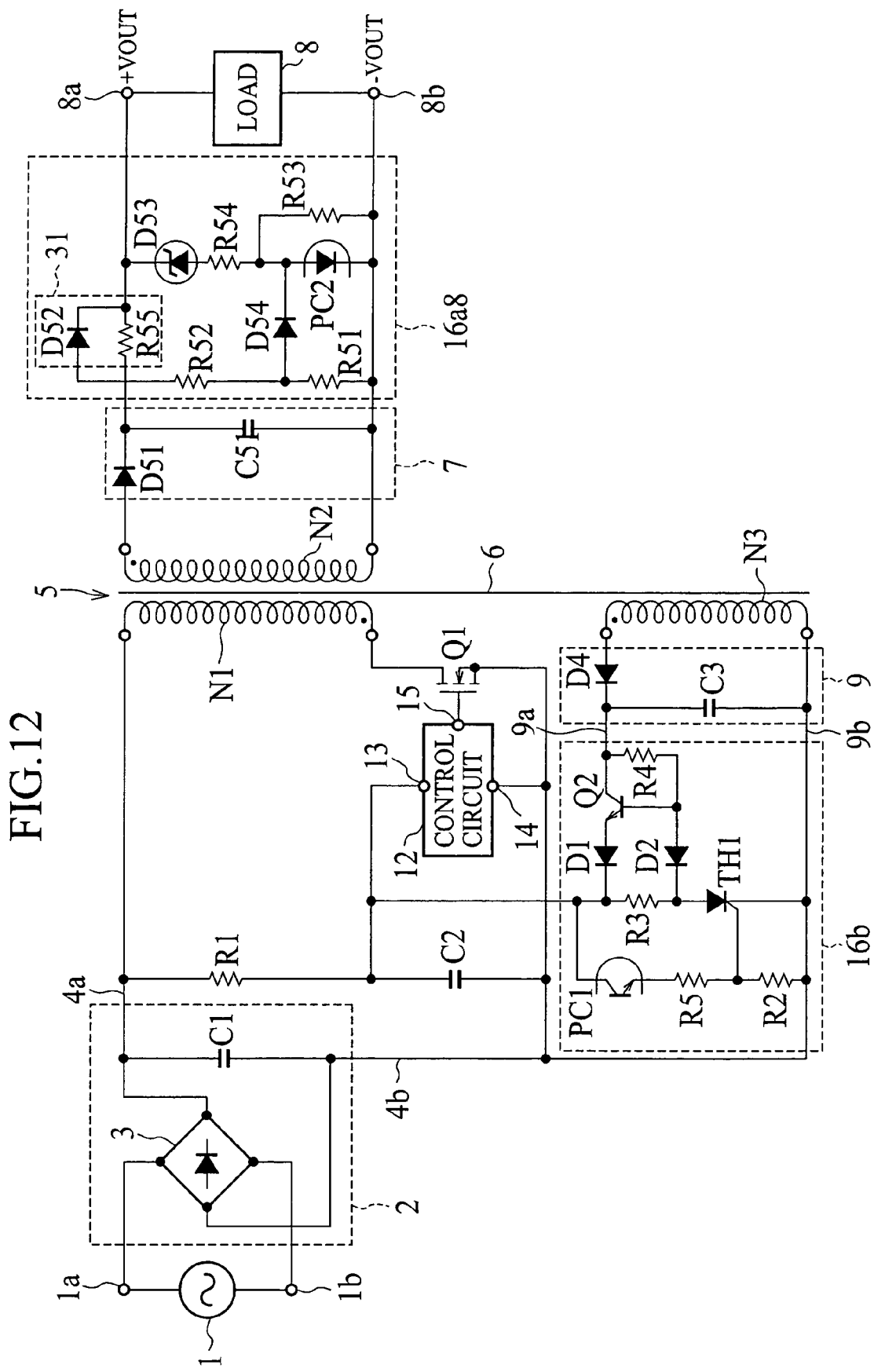
FIG. 12 is a circuit diagram showing a configuration of a power supply device of a ninth embodiment.

FIG. 12 is a circuit diagram showing a configuration of the power supply device of the ninth embodiment. Note that the same reference numerals and symbols are added to the same or corresponding portions as or to those of the power supply device of the fifth embodiment, and description thereof is omitted or simplified.

The resistor R55 is connected in series between the one end of the smoothing capacitor C51 and the positive-voltage direct current output terminal 8a. Hence, the main current of the power supply device, that is, the load current flows through the resistor R55. Although not shown in FIG. 12, the pair of current detection lines are connected to both terminals of the resistor R55, and the pair of current detection lines are connected to the control circuit 12. The control circuit 12 controls the switch Q1 to reduce the current outputted from the pair of direct current output terminals 8a and 8b to a predetermined value or less, when the current flowing through the resistor R55 becomes larger than a predetermined value.

The Schottky barrier diode D52 is thermally coupled to the resistor R55. Accordingly, when the resistor R55 turns to the overheat state in a similar way to the case where the rectifying diode D51 in the power supply device (refer to FIG. 7) of the fifth embodiment turns to the overheat state, the thyristor TH1 conducts, the switch Q1 turns to the off state, and the overheat protection is attained.

Also in the power supply device of the ninth embodiment, the Schottky barrier diode D52 and the resistor R55 can be composed as the mechanically-integrated composite part 31 as shown in FIG. 9 as in the sixth embodiment. According to the power supply device of the ninth embodiment, functions and effects, which are similar to those of the power supply device of the fifth embodiment, are exerted.

The present invention is not one limited to the above-described first to ninth embodiments, and for example, the following modifications are possible.

(1) The Schottky barrier diode D52 can be thermally coupled to a current detection resistor (not shown) connected in series to the primary winding N1, diodes and the smoothing capacitor C1, both of which are included in the diode bridge rectifying circuit 3, the capacitor C2 for the control power supply, and the like. In this case, when the Schottky barrier diode D52 is thermally coupled to the diodes, the composite part 28 shown in FIG. 3 can be used. Moreover, when the Schottky barrier diode D52 is thermally coupled to the resistor, the composite part 31 shown in FIG. 9 can be used.

(2) Instead of one Schottky barrier diode D52, a plurality of Schottky barrier diodes can be connected in parallel, and the plurality of Schottky barrier diodes can individually be thermally coupled to the resistor, the diode, the capacitor and the like, which are included in the power supply device.

(3) A configuration can be adopted such that power is supplied to a plurality of loads by providing a plurality of secondary windings N2 in the transformer 5, and a configuration can be adopted such that light outputs of a plurality of first circuits 16a are given to the one phototransistor PC1 by providing ones corresponding to the first circuit 16a to the respective load circuits.

(4) The circuits of the transistor Q2, the diode D1, the diode D2 and the resistor R4 are omitted, and the direct current line 9a can be directly connected to the capacitor C2 for the control power supply.

(5) Instead of the thyristor TH1 as the control element, another control switch element or control switch circuit that has the maintaining function can be used.

(6) The present invention can be applied to all the electric circuits without being limited to the power supply devices of the first to ninth embodiments.

(7) A light-emitting element or a buzzer is connected to the cathode side or anode side of the thyristor TH1, and when the thyristor TH1 conducts owing to the overheat, the light-emitting element is made to emit light, or the buzzer is activated, thus making it possible to notify a user of the overheat state.

(8) The whole or a part of the first circuit 16a and the second circuit 16b, which constitute the overheat and overvoltage protection circuit, can be combined, and integrally composed as one part.

(9) An element such as a first recovery diode (FRD), in which the reverse leakage current is varied depending on the temperature, can be applied as an alternative to the Schottky barrier diode D52.

As described above, according to the present invention, the power supply device capable of achieving the cost reduction to a great extent and capable of accurately setting the overheat protection level (latching temperature) and the overvoltage protection level (latching voltage), can be provided.

The invention claimed is:

1. A power supply device including a main circuit which converts an inputted alternating current or direct current into another direct current, and a control circuit which controls the main circuit, the power supply device comprising:

a Schottky barrier diode, which is placed as a temperature detection element at a region where a temperature is measured, to which a reverse voltage is applied, and through which a reverse leakage current flows;

detecting means for detecting the reverse leakage current flowing through the Schottky barrier diode; and a control element which stops an operation of the control circuit when an output of the detecting means becomes equal to or more than a predetermined value.

2. The power supply device according to claim 1, wherein the detecting means comprises:

a light-emitting element connected to a direct current output terminal of the main circuit;

a light-receiving element which flows a current in response to light emission of the light-emitting element; and current controlling means for flowing a current through the light-emitting element when a voltage corresponding to the reverse leakage current flowing through the Schottky barrier diode becomes equal to or more than a reference voltage, the current controlling means being connected between the Schottky barrier diode and the light-emitting element, wherein the control element stops the operation of the control circuit based on the current flowing through the light-receiving element.

3. The power supply device according to claim 2, wherein the current controlling means comprises:

a resistor connected in series to the Schottky barrier diode; and a comparator which sets a potential of an output terminal thereof to a low level when a voltage which occurs in the resistor by the reverse leakage current flowing through the Schottky barrier diode becomes equal to or more than the reference voltage, wherein the light-emitting element is connected between a positive electrode end of the direct current output terminals and an output terminal of the comparator, and has a current of a predetermined value or more flowing therethrough to emit light when output potential of the comparator is set to the low level.

4. The power supply device according to claim 3, comprising a zener diode connected between the output terminal of the comparator and a negative electrode end of the direct current output terminals, wherein the zener diode flows the current through the light-emitting element when a voltage between the direct current output terminals becomes larger than a predetermined breakdown voltage.

5. The power supply device according to claim 2, wherein the current controlling means comprises:

a resistor connected in series to the Schottky barrier diode; and a transistor which is turned on when a voltage which occurs in the resistor by the reverse leakage current flowing through the Schottky barrier diode becomes equal to or more than the reference voltage, wherein the light-emitting element is connected between a positive electrode end of the direct current output terminals and the transistor, and has a current of a predetermined value or more flowing therethrough to emit light when the transistor is turned on.

6. The power supply device according to claim 5, comprising a zener diode connected between the light-emitting element and a negative electrode end of the direct current output terminals, wherein the zener diode flows the current through the light-emitting element when a voltage between the direct current output terminals becomes larger than a predetermined breakdown voltage.

7. The power supply device according to claim 2, wherein the current controlling means comprises a resistor connected in series to the Schottky barrier diode, wherein the light-emitting element is connected to both ends of the resistor, and has a current of a predetermined value or more flowing therethrough to emit light when a voltage which occurs in the resistor by the reverse leakage current flowing through the Schottky barrier diode becomes equal to or more than a forward threshold voltage.

8. The power supply device according to claim 2, wherein the current controlling means comprises:

a resistor connected in series to the Schottky barrier diode; and a diode in which an anode is connected to a connecting point of the Schottky barrier diode and one end of the resistor, wherein the light-emitting element is connected between a cathode of the diode and the other end of the resistor, and has a current of a predetermined value or more flowing therethrough to emit light when a voltage which occurs in the resistor by the reverse leakage current flowing through the Schottky barrier diode becomes equal to or more than a sum of a forward threshold voltage of the diode and a forward threshold voltage of the light-emitting element.

9. The power supply device according to any one of claims 7 and 8 comprising a zener diode connected between a positive electrode end of the direct current output terminals and the light-emitting element, wherein the zener diode flows the current through the light-emitting element when a voltage between the direct current output terminals becomes larger than a predetermined breakdown voltage.

10. The power supply device according to claim 1, comprising a rectifying diode connected to a passage of a main current in the main circuit, wherein the Schottky barrier diode and the rectifying diode are thermally coupled to each other and mechanically integrated with each other.

11. The power supply device according to claim 1, comprising a current detection resistor connected to a passage of a main current in the main circuit, wherein the Schottky barrier diode and the current detection resistor are thermally coupled to each other and mechanically integrated with each other.

* * * * *